United States Patent
Hosler et al.

(10) Patent No.: US 6,942,381 B2
(45) Date of Patent: Sep. 13, 2005

(54) MOLTEN CRYOLITIC BATH PROBE

(75) Inventors: Robert B. Hosler, Sarver, PA (US); Xiangwen Wang, Export, PA (US); Jay N. Bruggeman, Harrison City, PA (US); Patrick J. O'Connor, New Kensington, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 10/672,462

(22) Filed: Sep. 25, 2003

(65) Prior Publication Data

US 2005/0069018 A1 Mar. 31, 2005

(51) Int. Cl.$^7$ .............................. G01K 7/02; G01K 1/08; G01N 1/00
(52) U.S. Cl. ..................... 374/139; 374/179; 73/864.53
(58) Field of Search ............................. 374/10, 12, 45, 374/139, 157, 179, 13; 73/864.51, 61.76; 136/234; 266/274, 275

(56) References Cited

U.S. PATENT DOCUMENTS

| | | | |
|---|---|---|---|
| 3,559,452 A | * 2/1971 | Perbix et al. .................. 374/26 |
| 3,729,397 A | * 4/1973 | Goldsmith et al. ......... 205/363 |
| 3,756,082 A | * 9/1973 | Bardenheuer et al. ...... 374/140 |
| 3,882,727 A | * 5/1975 | Clark et al. .................. 374/208 |
| 4,003,814 A | * 1/1977 | Tarassoff et al. ............ 204/422 |
| 4,358,948 A | * 11/1982 | Plessers ........................ 374/26 |
| 4,450,063 A | 5/1984 | Johnston et al. ............ 204/400 |
| 4,599,975 A | 7/1986 | Reeve et al. ................. 122/379 |
| 4,618,266 A | 10/1986 | Feller .......................... 374/41 |
| 4,859,076 A | 8/1989 | Twerdochlib ................ 374/10 |
| 4,871,263 A | 10/1989 | Wilson ........................ 374/139 |
| 4,901,061 A | 2/1990 | Twerdochlib ................ 340/604 |
| 5,037,211 A | * 8/1991 | Nakashima et al. ......... 374/139 |
| 5,163,321 A | 11/1992 | Perales ........................ 73/151 |
| 5,295,745 A | 3/1994 | Cassettari et al. ............. 374/10 |
| 5,394,749 A | * 3/1995 | Gabelich ...................... 73/295 |
| 5,577,841 A | * 11/1996 | Wall ............................ 374/140 |
| 5,713,668 A | * 2/1998 | Lunghofer et al. .......... 374/179 |
| 5,720,553 A | * 2/1998 | Falk ............................. 374/26 |
| 5,752,772 A | 5/1998 | Verstreken et al. .......... 374/139 |
| 6,050,723 A | 4/2000 | Amra .......................... 374/140 |
| 6,059,453 A | 5/2000 | Kempf et al. ................ 374/179 |
| 6,065,867 A | 5/2000 | Sulmont et al. ............. 374/139 |
| 6,183,620 B1 | 2/2001 | Verstreken ................... 205/336 |
| 6,220,748 B1 | * 4/2001 | Bates ........................... 374/10 |
| 6,454,459 B1 | * 9/2002 | Sillen et al. ................. 374/139 |
| 6,767,130 B2 | * 7/2004 | Popelar et al. .............. 374/139 |
| 2003/0193988 A1 | * 10/2003 | Bates ........................... 374/10 |

FOREIGN PATENT DOCUMENTS

JP   55087031 A  *  7/1980  .......... G01N/25/48

OTHER PUBLICATIONS

Heraeus, Cry–O–Therm, "Bath and Liquidus Temperature Measurement System For the Aluminium Industry", Revision C01–1998.

* cited by examiner

Primary Examiner—Gail Verbitsky
(74) Attorney, Agent, or Firm—Tracey D. Beiriger; Eckert Seamans Cherin & Mellot, LLC

(57) ABSTRACT

A method and apparatus for accurately measuring superheat, bath ratio and alumina concentration in an aluminum smelting bath. In one embodiment, a reusable probe determines the bath temperature and bath sample superheat. In other embodiments, the probe also determines bath composition including bath cryolite ratio and alumina concentration.

10 Claims, 7 Drawing Sheets

MOLTEN CRYOLITIC BATH PROBE

BACKGROUND OF THE INVENTION

1. Field of the Invention

The present invention relates to the testing of molten material, more particularly relates to a method and apparatus which uses differential temperature measurements to determine characteristics such as superheat, alumina concentration and sodium fluoride to aluminum fluoride ratio of an aluminum smelting bath.

2. Prior Art

Aluminum is conventionally produced in a smelting operation in an electrolytic cell of the established Hall-Heroult design. In a conventional Hall cell, alumina is electrolytically reduced to aluminum in a molten electrolytic bath generally composed of sodium cryolite ($Na_3AlF_6$) and aluminum fluoride ($AlF_3$) as well as other additives. Alumina ($Al_2O_3$) is introduced into the molten electrolyte bath, dissolves and reacts to form carbon dioxide and aluminum that accumulates as molten aluminum pad. Control parameters monitored during an aluminum smelting operation include the temperature of the bath and the composition of the molten electrolytic bath. Typically, samples of electrolyte are periodically withdrawn from the Hall cell and analyzed for the concentration of alumina and the ratio of the concentration of NaF to the concentration of $AlF_3$ (termed the bath ratio) in laboratory batch tests. Such laboratory tests are typically completed several hours or days after the sampling occurs with little indication of current process conditions.

One probe that has been developed to measure the bath temperature and liquidus temperature of an aluminum smelting bath is described in U.S. Pat. No. 5,752,772 and is available from Heraeus Electro-Nite under the commercial designation of Cry-O-Therm. The probe includes a copper cup surrounded by a cardboard tube and a thermocouple extending into the cup. The probe is submerged in the molten bath and a bath temperature reading is taken. A sample of the bath in the cup is removed and allowed to cool. The temperature of the cooling sample is monitored over time. An abrupt change in the slope of the cooling curve for the sample is taken as the liquidus temperature for the bath. The difference between the bath temperature and the liquidus temperature is determined to be the superheat of the bath. The probe has several drawbacks including its limited utility (no ability to measure the bath ratio) and fragility in the Hall cell environment. The temperature probe may be used only once because the copper cup, cardboard tube and thermocouple of the probe are damaged by exposure to the harsh conditions of the smelting bath. In addition, a portion of the molten aluminum pad produced in the Hall cell occasionally rises up into the smelting bath and contacts the temperature probe. Such direct metal contact destroys the probe before temperature readings can even be made. Likewise, when carbon dust accumulates on the surface of the bath, the probe cannot make an accurate temperature measurement.

An apparatus for measuring the bath ratio as well as the superheat of an aluminum smelting bath is disclosed in U.S. Pat. No. 6,220,748, incorporated herein by reference. The apparatus includes a test sensor that measures the temperature of a sample of the bath and a reference sensor which measures the temperature of a reference material. The reference material does not undergo a phase change whereas the test sensor detects the temperature of the sample of smelting bath as it cools and solidifies. The temperature differential between the reference sensor and the test sensor is monitored and analyzed to determine various characteristics of the bath. The $NaF:AlF_3$ ratio and $Al_2O_3$ concentration in the bath are determined in order to control smelting of aluminum metal. In addition, the bath temperature and liquidus temperature are measured to determine the amount of superheat in the bath. In the apparatus disclosed in the patent, the reference sensor and the test sensor are positioned at spaced apart locations. It has been found that the accuracy and consistency of the temperature measurements of the spaced apart sensors are insufficient for determining the bath composition.

Accordingly, a need remains for a molten bath testing probe which accurately determines superheat and bath composition in an aluminum smelting bath.

SUMMARY OF THE INVENTION

This need is met by the molten bath testing probe of the present invention and method of its use. One embodiment of the molten bath testing probe includes a singular (one-piece) metal body having pair of integrally formed receptacles that is submersible into a bath of molten material, e.g. electrolyte, to obtain two samples of the molten material. Temperature sensors are received in each of the sample receptacles. The probe includes an analyzer for determining the temperature of the molten material in the sample receptacles when the receptacles are submersed in the bath and the temperature change at which the molten material in the sample receptacles begin to solidify after the body is removed from the bath. The thermocouples may be K-type thermocouples. The body of the probe is formed from steel and may be repeatedly used for testing the molten bath. The analyzer includes means for determining the superheat of the bath.

Another aspect of the present invention is to provide a method of testing molten bath that includes steps of submersing a metal body having a pair of integrally formed receptacles into a bath of molten material, filling the sample receptacles with the molten material, removing the body with the filled sample receptacles from the bath, measuring a first temperature of the molten material with the temperature sensors, allowing the molten material to cool while measuring the temperature of the cooling molten material, measuring a second temperature of the molten material when the cooling rate of the molten material changes and determining the difference between the first and second temperatures. When the second temperature is measured at the liquidus temperature for the molten bath, the temperature difference is a measurement of the superheat of the bath. The cooled material within the sample receptacles may be reheated and removed so that the body may be reused.

Another embodiment of the invention includes a molten bath testing probe having a singular body comprising an integrally formed sample receptacle and reference member. The sample receptacle defines a well for submersing into a bath of molten material and holding a sample of molten bath. The reference member comprises a solid reference material. A sample temperature sensor is received in the sample well and a reference temperature sensor contacts the reference material. An analyzer is included for determining differences between the temperature of molten material in the well and the temperature of the reference material. In use, the testing probe is submerged into a molten bath to fill the sample well and is removed from the bath. Upon cooling, the molten material in the sample well undergoes a phase change and solidifies. The reference material undergoes no phase change. The difference between the temperature of the reference material and the molten material is determined while the molten material and the reference material cool. The rate at which the temperature differential changes as a function of the cooling of the molten material is an indication of the operation of the bath.

DETAILED DESCRIPTION OF THE PREFERRED EMBODIMENTS

Figure 1:
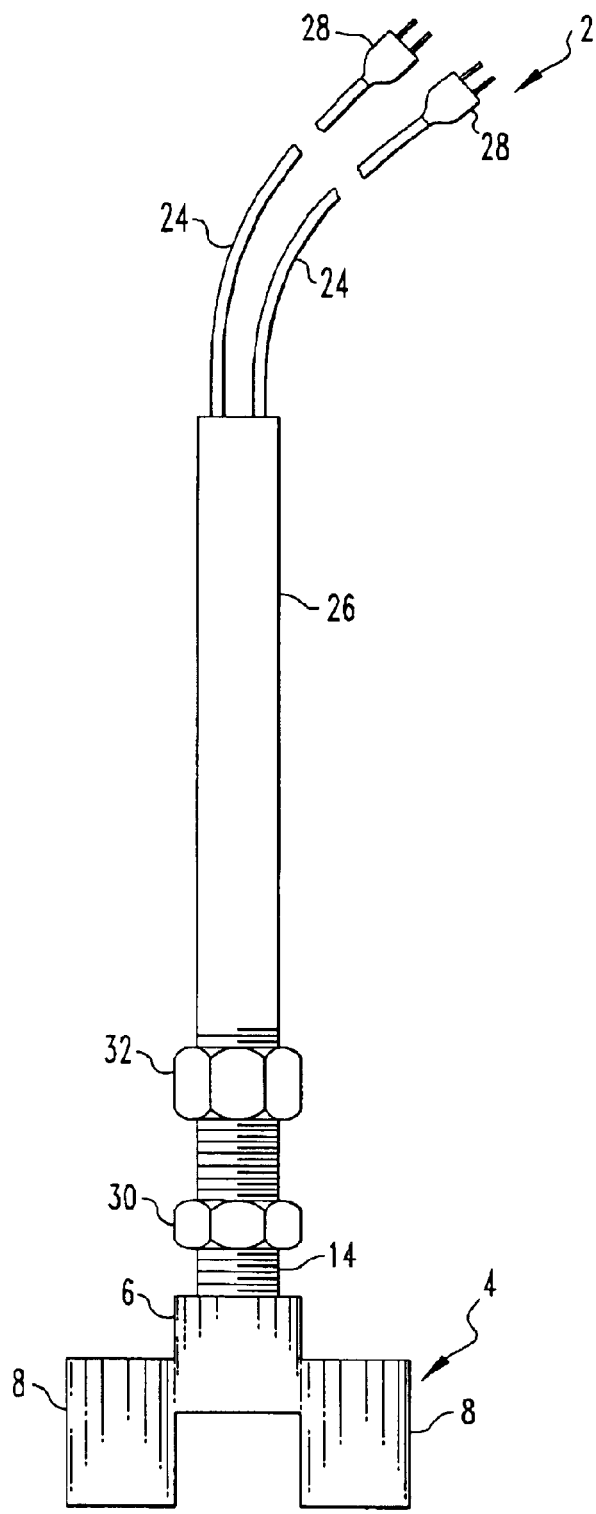
FIG. 1 is a plan view of an aluminum smelting bath probe made in accordance with one embodiment of the present invention.
Figure 2:
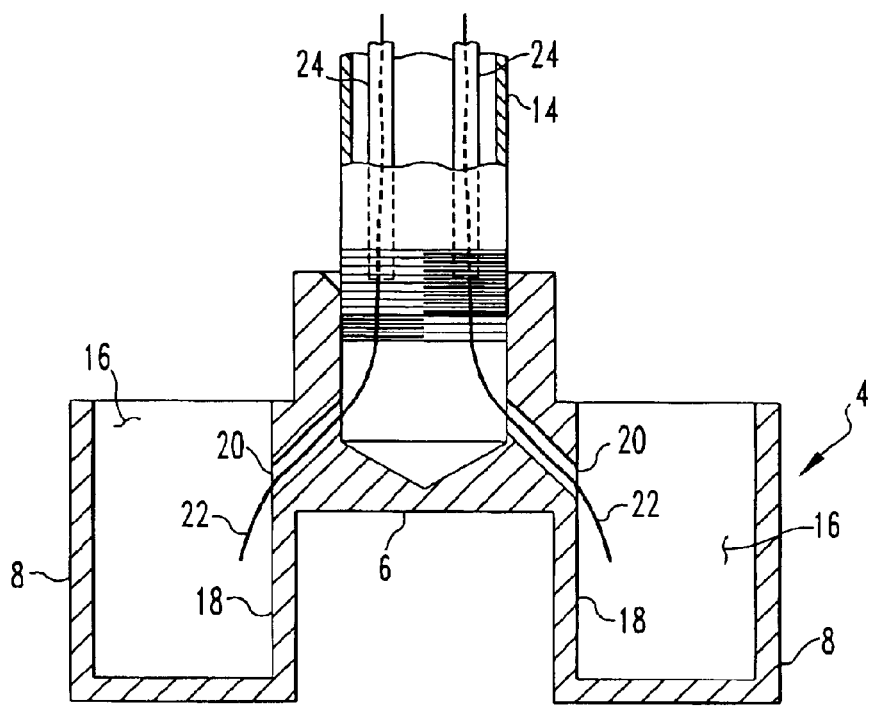
FIG. 2 is a sectional side view of a portion of the probe shown in FIG. 1.
Figure 3:
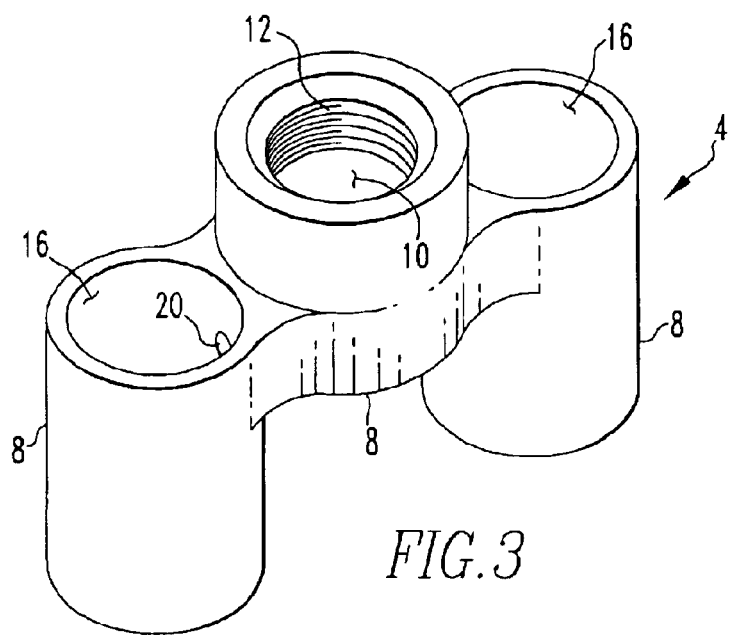
FIG. 3 is a perspective view of the probe body shown in FIG. 1.
Figure 4:
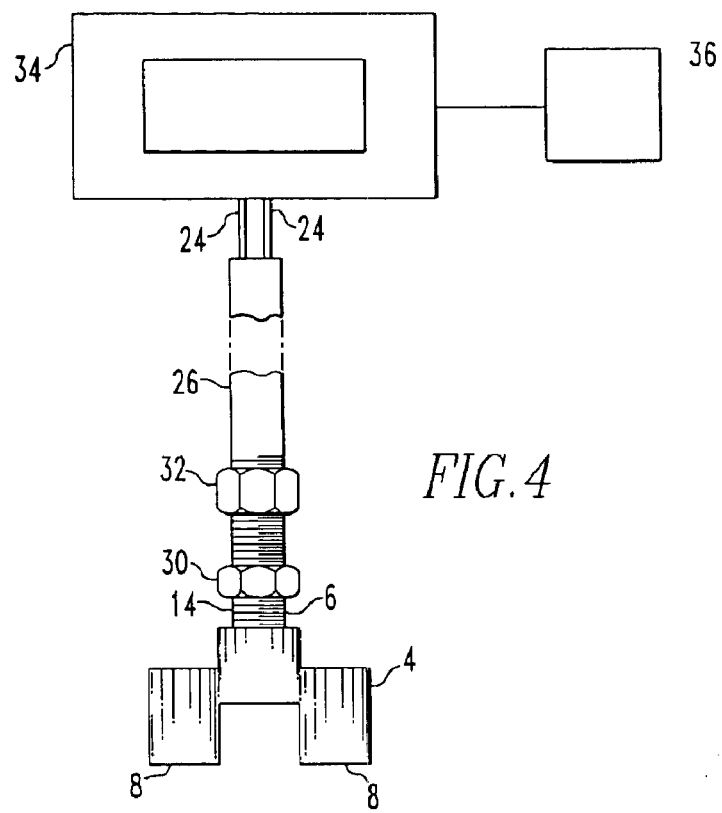
FIG. 4 is a schematic of a testing system incorporating the probe shown in FIG. 1.

A complete understanding of the invention will be obtained from the following description when taken in connection with the accompanying drawing figures wherein like reference characters identify like parts throughout. For purposes of the description hereinafter, the terms "upper", "lower", "right", "left", "vertical", "horizontal", "top", "bottom" and derivatives thereof relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is described in reference to testing the temperature of a molten smelting bath. However, this is not meant to be limiting as the present invention is applicable to other testing environments.

FIGS. 1–4 illustrate a molten material testing probe 2 having a singular metal body 4 including a central portion and a pair of sample receptacles 8 flanking the central portion 6. The central portion 6 defines a connection port 10 which is internally threaded at 12 to receive externally threaded conduit 14. The sample receptacles 8 each define a sample well 16 for receiving molten bath. Walls 18 of the sample receptacles 8 are shown as cylindrical, but this is not meant to be limiting as other geometric configurations may be used. A passageway 20 is defined in the central portion 6 and walls 18. One end of a temperature sensor 22 extends through conduit 14 and a passageway 20 and is received in sample well 16. The temperature sensors 22 are preferably thermocouples such as K-type thermocouples. The type of thermocouple 22 selected is determined by the surrounding environment and the accuracy requirements. While other thermocouples having greater accuracy may be used, such as a Type-S platinum-rhodium thermocouple, it has been found that calibrated Type-K thermocouples provide sufficient accuracy for controlling an aluminum smelting bath. The other end of each temperature sensor 22 is received in a sheath 24 and the sheathed thermocouples 22 extend out of conduit 14 and through tubing 26. The distal ends of the thermocouples 22 terminate in electrical connectors 28 for connection to an analyzer 34 and optional printer 36. The tubing may be of any desired length such as about 0.5 to about 10 feet in length for use in testing aluminum smelting baths. Nut 30 is threadable on conduit 14 to tighten and seal conduit 14 within the port 10. Nut 32 is threadable on ends of each of the conduit 14 and tubing 26 to join them together. The tubing 26 may be threaded directly onto the threads 12 of the central portion 8 thereby eliminating nuts 30 and 32 and conduit 14. The components of the testing probe 2 are made of materials suitable for use and reuse in an aluminum smelting bath. A particularly suitable material for the probe body 6 is stainless steel, e.g. alloy 304L.

Figure 5:
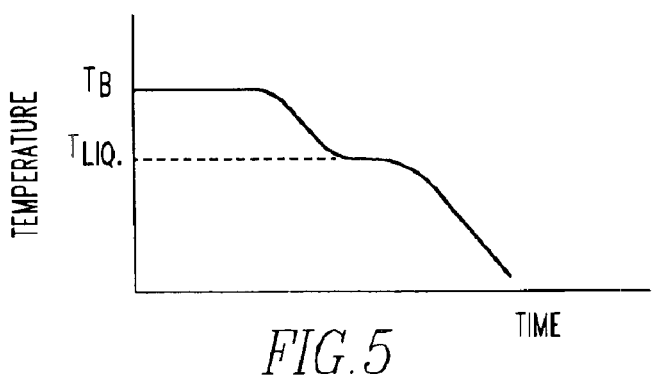
FIG. 5 is a schematic temperature profile produced using the system shown in FIG. 4.

In use, the end of the testing probe 2 is placed into a bath of molten material such that the sample receptacles 8 are submerged in the bath and the sample wells 16 fill with molten material. The temperature sensors 22 provide a temperature reading of the molten material while the body 6 is in the bath. After a stable bath temperature is noted, the body 6 is removed from the bath with the sample wells 16 filled with molten material. The molten material samples are cooled, e.g. to about 850° C. via ambient air, convection or other means. While the molten material is cooling, the temperature of the material in each of the sample wells 16 is recorded by the analyzer 34. The analyzer 34 includes software for plotting a temperature profile of the temperature of the material samples over time and for calculating the superheat of the bath. FIG. 5 is a schematic plot of temperature detected in the sample wells 16 over time. While the testing probe is within the smelting bath, the temperature is generally constant as indicated at $T_B$. When the testing probe is removed from the bath, the temperature begins to fall as the molten material cools. At the liquidus temperature $T_{LIQ}$, the molten material begins to freeze. At that stage, the cooling rate for the molten material slows for a period of time until the cooling rate again increases. The analyzer 34 detects the point at which the cooling rate slows and calculates the difference between $T_B$ and $T_{LIQ}$ as the superheat of the bath.

The probe 2 may be reused by resubmerging the body 4 in the bath until the solidified material in the sample wells 16 melts. For sample wells 16 holding about 2–3 milliliters of material, remelting is accomplished in about three to four minutes. The testing probe 2 is tipped so that the remelted material in the sample wells 16 pours back into the bath. The testing probe 2 is then ready for use in another testing process.

Figure 6:
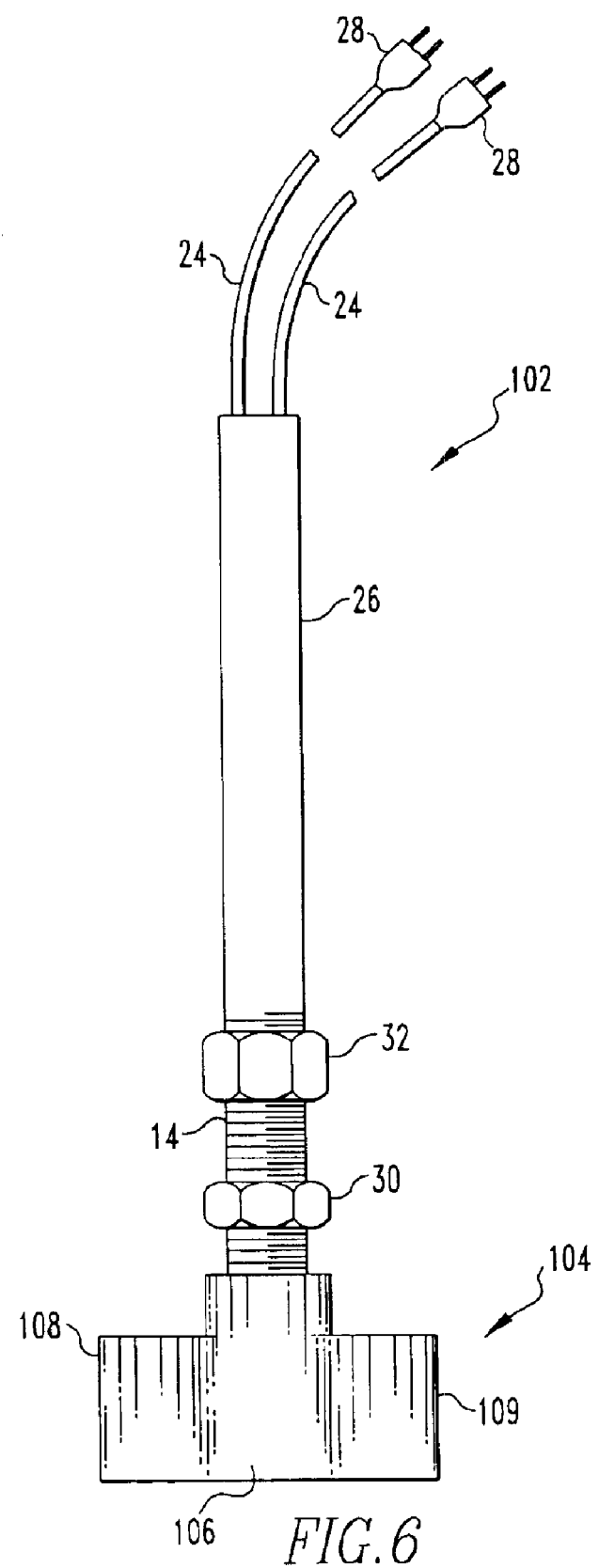
FIG. 6 is a plan view of aluminum smelting bath probe made in accordance with another embodiment of the present invention.
Figure 7:
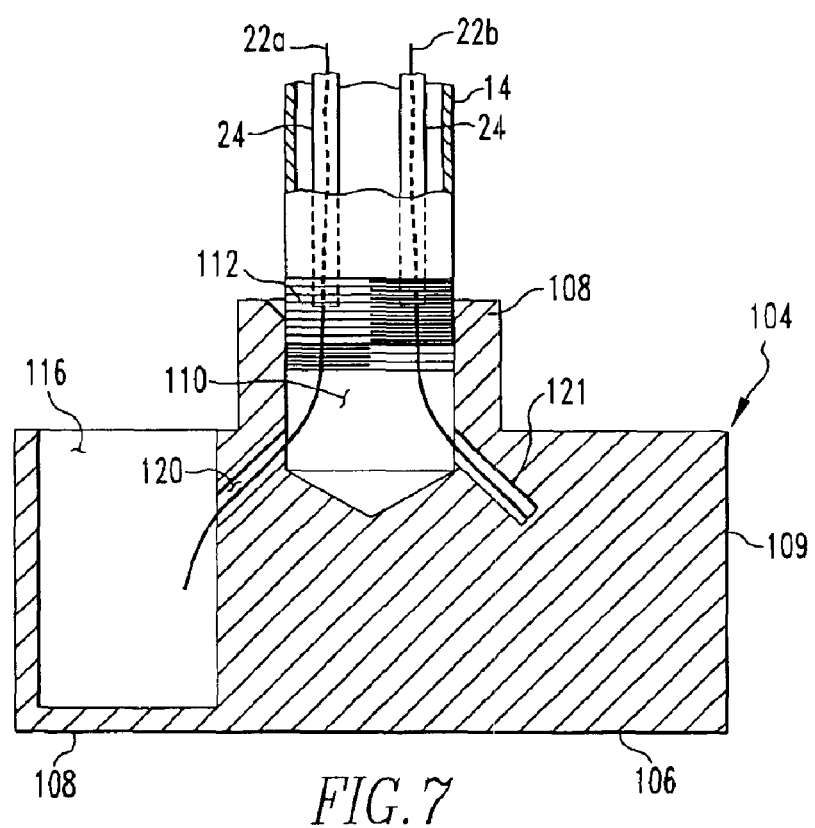
FIG. 7 is a schematic view of a portion of the smelting probe of FIG. 6.
Figure 8:
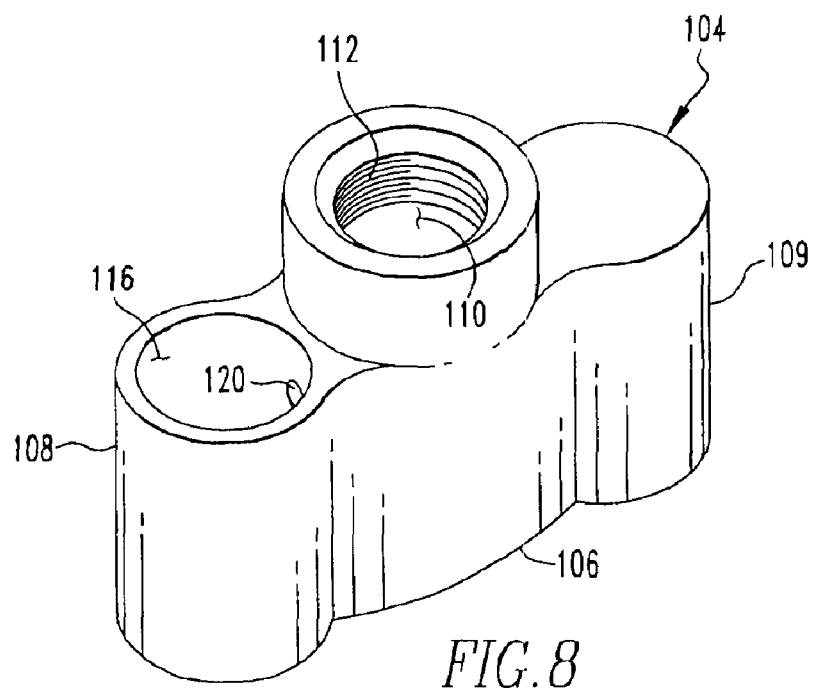
FIG. 8 is a perspective view of the probe body shown in FIG. 6.

Another embodiment of the invention is shown in FIGS. 6–8. The testing probe 102 shown in FIGS. 6–8 is similar to the probe 2 shown in FIGS. 1–4 but differs in the metal body 104 used in place of body 4. The probe 102 may be used in connection with the analyzer 34 and printer 36 of FIG. 4. The metal body 104 includes a central portion 106 flanked by a sample receptacle 108 and a reference member 109. The central portion 106 defines a connection port 110 that is internally threaded at 112 to receive the externally threaded conduit 14. The sample receptacle 108 defines a sample well 116. While each of the sample receptacle 108, central portion 106 and reference member 109 are shown as having general cylindrical shape, they are formed together as a single structure of the body 104 and the cylindrical shapes are not meant to be limiting. Reference member 109 includes a solid reference material that is integrally formed with the body 104. In this manner, the reference material is composed of the same material as that which makes up the central portion 106 and the sample receptacle 108. A passageway 120 is defined in the central portion 106 extending between the connection port 110 and the sample well 116. A reference bore 121 is defined in the reference member 109 and is open to the connection port 110. A pair of temperature sensors 22a and 22b bearing sheaths 24 extend through conduit 14. One end of sensor 22a extends through the passageway 120 and is received in the sample well 116. In a similar manner, one end of sensor 22b extends into the reference bore 121 and abuts the material of the reference member 109. The other ends of sensors 22a and 22b extend out through conduit 14 and tubing 26 and terminate in suitable electrical connectors 28. The components of the testing probe 102 are made of materials suitable for use and reuse in an aluminum smelting bath. A particularly suitable material for the probe body 104 (including the material of the reference member 109) is stainless steel, e.g. alloy 304L.

In use, the end of testing probe 102 is placed in a bath of molten material to submerge the body 104 thereby filling the sample well 116 with molten material and surrounding the reference member 109 by molten material. The temperature sensor 22a provides a temperature reading of the molten material while the probe 102 is in the bath. The temperature sensor 22b is not exposed to the bath, but instead detects the temperature of the material of the reference member 109. After a stable bath temperature is detected with the sensors 22a and 22b, the testing probe 102 is removed from the bath with the sample well 116 filled with molten material. The test sensor 22a may be used to determine bath temperature and super heat temperature as described above in reference to use of probe 2. However, probe 102 has additional functionality.

Figure 9:
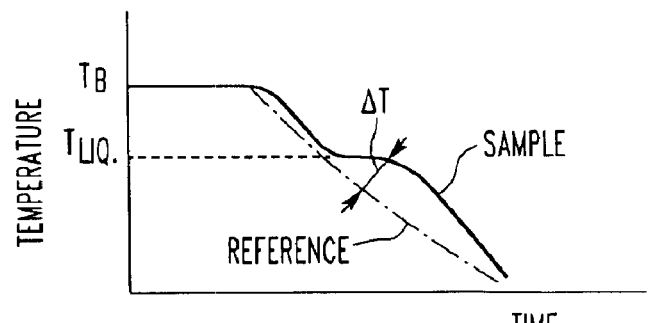
FIG. 9 is a schematic temperature profile produced using the probe shown in FIG. 6.

Referring to FIG. 9, the temperature profile for the cooling material in the sample well 116 is schematically represented with changes in slope of the temperature profile during phase changes. The material of the reference member 109 does not undergo a phase change, and the slope of the temperature profile for the cooling reference member is smooth. During the cooling process, the difference in temperature between the sample and the reference material is recorded as delta temperature ($\Delta T$) as a function of temperature and/or time. A schematic of the change in $\Delta T$ over time is shown in FIG. 9. The thermal arrests indicated by increases and decreases in $\Delta T$ are indicative of the formation of different phases as the test sample cools.

In particular, the magnitude of $\Delta T$ occurring between about 400° C. and the $T_{LIQ}$ is directly correlated to bath ratio ($NaF:AlF_3$) at a constant alumina concentration. The $\Delta T$ at about 700 to 900° C. is correlatable to the alumina concentration at a constant bath ratio. The differential temperature profile also shows the liquidus or temperature at which the molten material begins to freeze by means of a first slope change of the differential temperature during cooling. The peaks and valleys of the $\Delta T$ occurring over the temperature range allow determination of parameters such as alumina concentration, bath ratio and superheat.

The following examples illustrate various aspects of the present invention.

EXAMPLE 1

Figure 10:
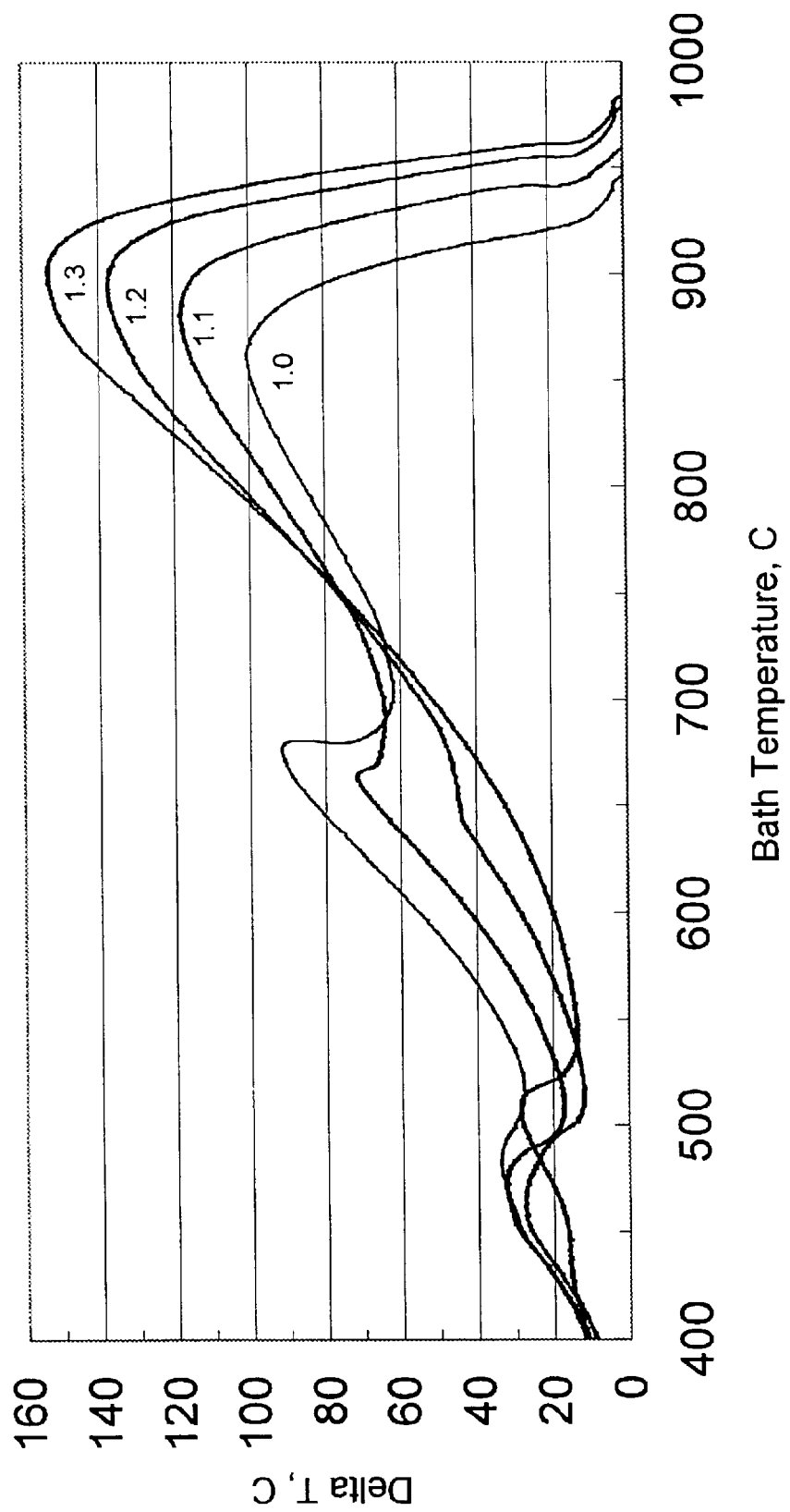
FIG. 10 is a temperature differential profile for various bath ratios at constant alumina concentration produced by using a probe as shown in FIG. 6.

A probe made in accordance with the embodiment of FIGS. 6–8 was used to test a series of aluminum smelting baths. In each bath the alumina concentration was held constant at about 2.6 wt. %. A different $NaF:AlF_3$ ratio was set in each run of the bath from 1.0 to 1.3. During the testing procedure, each bath was held at a temperature above the expected liquidus temperature. A sample of the bath was taken for analysis of the $NaF:AlF_3$ ratio via x-ray diffraction and pyrotitration methods. The amount of alumina was determined by a LECO oxygen analyzer. After adjusting the bath ratio and the alumina concentration to the desired level, the probe was submerged in the bath. The probe remained submerged in the bath until a stable temperature was measured by the probe and a full cup of the bath was captured in the sample well. Upon measuring a stable temperature, the probe with filled sample well was removed from the bath and air cooled to at least 400° C. The $\Delta T$ profile was recorded as the sample was cooled and is shown versus bath temperature in FIG. 10 for each of the test runs. As the $NaF:AlF_3$ ratio increased from a value of 1.0 to a value of 1.3, the liquidus temperature as measured by the temperature differential increased, and the $\Delta T$ peak at about 850 to 930° C. increased while the $\Delta T$ peak at about 650 to 700° C. decreased. Based on the demonstrated relationships between $\Delta T$ changes and bath ratio for the various test samples, the probe of the present invention may be calibrated to determine and display the bath ratio for a particular bath.

EXAMPLE 2

Figure 11:
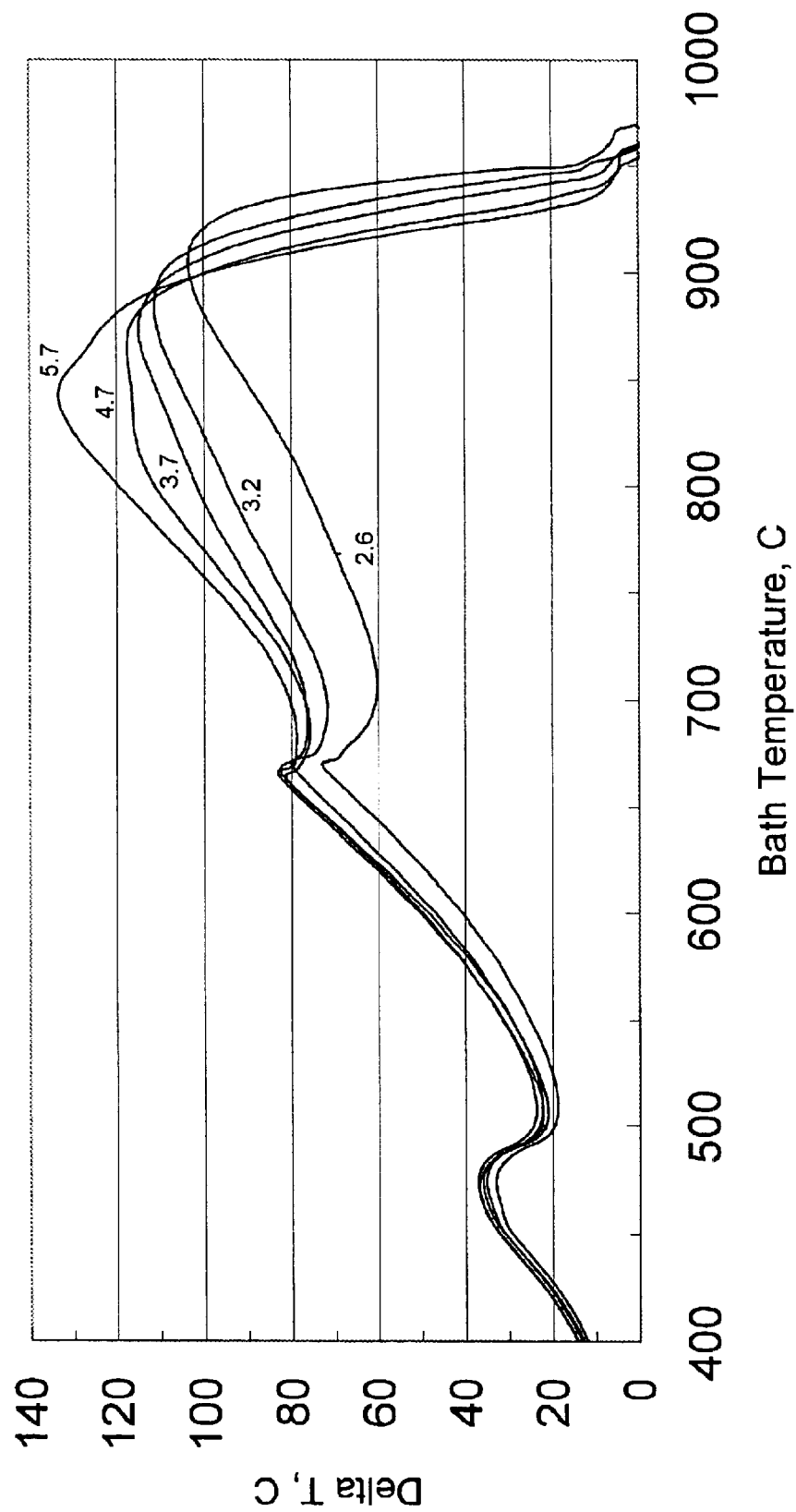
FIG. 11 is a temperature differential profile for various alumina concentrations at constant bath ratio produced by using a probe as shown in FIG. 6.

Example 1 was repeated except that the bath ratio was kept constant at 1.13 and the alumina concentration by weight was set in separate runs at 2.6%, 3.2%, 3.7%, 4.7% and 5.7%. A $\Delta T$ profile was produced for each run and appears in FIG. 11. As shown in FIG. 11, as the alumina concentration changes between 2.6% and 5.7%, the position and magnitude of the peaks and valleys in the $\Delta T$ profile changes accordingly. The alumina concentration may be correlated with the area under the $\Delta T$ profile between temperatures (e.g. 800–900° C.). Accordingly, the relationship between the $\Delta T$ profile and alumina concentration may be used to calibrate the probe of the present invention in order to determine the alumina concentration for a particular test sample.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A molten bath testing probe comprising:
a one-piece steel body having a pair of integrally formed open, empty receptacles in said body, neither of which contains a reference material or test sample, before submersing into a molten aluminum smelting bath material, for holding solely a sample of the molten material in each receptacle;
a temperature sensor received in each said receptacle; and
an analyzer in communication with said temperature sensors for determining a difference between the temperature of the samples of molten material in each of the receptacles when the receptacles are submersed and the temperature at which the samples of the molten material begins to solidify after the body is removed from the bath, where the probe is reusable, said one-piece steel body allowing reheat of any sample held in the receptacles to allow sample removal from the receptacles.

2. The molten bath testing probe of claim 1, wherein said body comprises a central portion, said sample receptacles being positioned on opposing sides of said central portion.

3. The molten bath testing probe of claim 1, wherein each said temperature sensor comprises a thermocouple extending into an interior of said receptacle.

4. The molten bath testing probe of claim 3, wherein said thermocouples each comprise a calibrated K-type thermocouple.

5. The molten bath testing probe of claim 1, wherein said body is 304 L alloy stainless steel.

6. The molten bath testing probe of claim 1, wherein said analyzer comprises means for determining freezing temperature of the bath.

7. The molten bath testing probe of claim 6, wherein said analyzer comprises means for determining superheat of the bath.

8. A molten material testing probe made of:

a one-piece steel body for submersing into a molten aluminum smelting bath material, with an open, empty sample receptacle for holding a sample of the molten material after submersion, and a reference member which is the one-piece steel body, wherein said receptacle and said reference member are integrally formed in said body from steel, in one-piece, where the steel is a stainless steel which does not undergo a phase change during operation of the probe, and during cooling, and the open receptacle does not contain a reference material or test sample before submersion;

a sample temperature sensor received in said open receptacle;

a reference temperature sensor contacting said reference member; and an analyzer in communication with said sample temperature sensor and said reference temperature sensor for determining a difference between a temperature of any molten material in the receptacle after submersion and a temperature of the reference member, the analyzer comprising means for determining whether the bath meets predetermined specifications of the concentration of alumina, the ratio of the amount of aluminum fluoride to the amount of sodium fluoride, and bath superheat.

9. The probe of claim 8, wherein each said temperature sensor comprises a thermocouple, the steel is 304 L alloy stainless steel, and the probe is reusable, said one-piece steel body allowing reheat of any sample to allow sample removal.

10. The probe of claim 9, wherein said thermocouples are calibrated K-type thermocouples.

* * * * *